United States Patent

Cree et al.

[11] Patent Number: 5,360,328
[45] Date of Patent: Nov. 1, 1994

[54] GAUGE BAND RANDOMIZER

[76] Inventors: Robert E. Cree, 127 Bartle Ave., Newark, N.Y. 14513; Ricardo P. Rodriguez, 1919 Royal Credit Blvd., Mississauga, Ontario L5M4Y1, Canada

[21] Appl. No.: 831,499

[22] Filed: Feb. 5, 1992

[51] Int. Cl.⁵ ............................................. B29C 53/10
[52] U.S. Cl. .................... 425/72.1; 425/325; 425/392
[58] Field of Search ............... 425/72.1, 325, 327, 425/392, 326.1, 387.1, 388; 264/566, 569

[56] References Cited

U.S. PATENT DOCUMENTS

| | | | |
|---|---|---|---|
| 2,844,846 | 7/1958 | Kronholm | 425/72.1 |
| 3,161,942 | 12/1964 | Cheney | 29/2.12 |
| 3,231,651 | 1/1966 | Cheney | 264/146 |
| 3,337,107 | 8/1967 | Catallo et al. | 226/197 |
| 3,492,693 | 2/1970 | Clarke et al. | 264/209.2 |
| 3,576,935 | 4/1971 | Dyer et al. | 264/563 |
| 3,632,265 | 1/1972 | Upmeier | 425/326.1 |
| 3,657,974 | 4/1972 | Hedrich et al. | 493/311 |
| 3,684,421 | 8/1972 | Pilcher | 425/327 |
| 3,716,322 | 2/1973 | Kratzert | 425/392 |
| 3,768,949 | 10/1973 | Upmeier | 425/325 X |
| 3,804,572 | 4/1974 | Upmeier | 425/326.1 |
| 4,634,358 | 1/1987 | Dellbrugge | 425/387.1 X |
| 4,643,656 | 2/1987 | Karl | 425/327 X |
| 4,650,406 | 3/1987 | Peters | 425/326.1 X |
| 4,650,407 | 3/1987 | Taguchi | 425/72.1 |
| 4,676,728 | 6/1987 | Planeta | 425/387.1 |
| 4,760,627 | 8/1988 | Schele | 425/327 X |
| 4,836,744 | 6/1989 | Karl et al. | 425/72.1 |
| 5,013,234 | 5/1991 | Reinhold | 425/327 |

Primary Examiner—Richard L. Chiesa
Attorney, Agent, or Firm—Fish & Richardson

[57] ABSTRACT

An oscillating hauloff device for removing blown film from an extruding apparatus. The oscillating hauloff includes a stacked ring arrangement which provides a compact and stable structure. The turning bars and idler rolls are encompassed in the ring structure and are arranged to cancel effects of web wandering and wrinkling. A method for making the oscillating hauloff, including CNC machining of annealed ring-shaped weldments, that is economical and simple to manufacture. The turning bars are provided with reinforcements that prevent deflection of the turning bars during use. Further the turning bars are provided with flow restricted outlets and axially extending channels to supply uniform air pressure to float the blown film on the turning bars. A specific arrangement for providing utility services to the oscillating hauloff is also disclosed which employs torsional deflection of the loads during rotation of the rings. The oscillating hauloff is suitable for receiving film extruded downwards with only minor adjustments in structure from the unit for upwardly extruded film.

20 Claims, 15 Drawing Sheets

GAUGE BAND RANDOMIZER

BACKGROUND OF THE INVENTION

The present invention relates to an oscillating hauloff device for removing a blown film from an extruding apparatus.

Oscillating haul-offs for removing a blown film from an extruding apparatus have been known for some time. The major design configuration that has been commercially successful for many years is an oscillating hauloff produced by the Windmoeller and Hoelscher (W&H).

Following extrusion of blown film, the film typically is in the form of a bubble. The sides of the bubble are then forced together when they reach nip rolls in the hauloff device. As the bubble is passed through the nip rolls, thickness variations exist around the circumference of the bubble. If this film is wound directly onto a roll, the thicker areas will cause the wound roll to build up faster than the thinner areas, creating hills and valleys on the wound roll surface. A major problem arises when such rolls are taken from the extrusion process and subsequently unwound and conveyed through converting equipment such as printing presses, laminators or bag machines.

Uneven rolls considerably reduce the speed of this equipment and the quality of finished product. The unevenness of the roll causes slack in some areas of the film and tightness in other areas which ultimately causes creases in the film web. On the printing press, for example, the ink will not transfer to the film inside of a crease which degrades product quality. These manufacturing processes have to use spreader rolls or other means in an attempt to eliminate these creases. These additional processing steps complicate and slowdown the process.

In other downstream equipment, the bag machine has several nip rolls in order to draw the film into the sealing and/or punching area. When the film is drawn through these nips rolls any slack area will result in further creases. If the crease happens to be in a location where a seal is placed, that seal will be defective.

In all cases, the better the roll quality coming from the extrusion line, the faster one can run the downstream equipment and the probability is increased of producing a better quality product. While the need for improved roll quality has been recognized for some time and there have been several attempts at solving it, these attempts still have a number of deficiencies.

An initial attempt to solve the quality problem utilized a vertical design oscillating hauloff. This device had a significant vertical height requirement; the wider the film, the taller is the oscillating hauloff and the taller is the required building to house it.

Another problem with the vertical design, is that the film has to go around several vertical idler rolls which act as an accumulator as the unit rotationally oscillates. As film accumulates, overall output speed slows because some of the film's speed is taken up by the accumulation. The reverse happens when the unit reverses direction, line speed increases. This results in a variation in line speed that can cause film walking in the winder which degrades roll quality.

Other problems associated with subsequent prior art devices include the stability of the unit. One type of oscillating hauloff unit consisted of a frame having a small diameter shaft suspended from the center. It had horizontally mounted idler rolls and turning bars which turned at angles to one another to effect web direction corrections. The whole oscillating hauloff unit including all the idler rolls and turning bars as well as the nip rolls and collapsing frame were suspended from this single shaft. Any touching of the unit during operation caused it to swing resulting in film wandering and wrinkling. This single shaft also limited the size and location of auxiliary equipment such as air collapsing frames and associated blowers that could be suspended under the oscillating hauloff. Even if the extra weight could be handled, the support shaft would bend and cause misalignment if the load was not equally balanced. Such a machine would not be applicable or would have substantial drawbacks if applied to extrusion lines oriented to extrude the film downwardly.

Another problem which has occurred in prior art devices is uncontrolled wandering of the film. In horizontal designs, there have been two turning bars which work together to allow for a total oscillation of 360 degrees. As with any turning bar, frictional forces cause a slight shift in axial position as the film passes around its diameter. This is in addition to the pure geometrical shift associated with its diameter. It is well understood that the geometrical shift can be negated by properly offsetting the turning bar from the center of rotation. However, the wandering due to frictional effects has not been corrected and wrinkles have been induced. The result is that although normal process gauge variations are spread evenly over the surface of the wound roll, the wrinkles and associated creases due to wandering are wound into the finished roll.

Yet another problem of prior art devices is that the turning bars can be permanently deformed by deflection. This is because turning bars are hollow and lack sufficient rigidity due to the many air outlet holes in their surface, and thus, over time, forces exerted by the film have deformed the bars.

Another problem is related to the method for distributing utilities such as electrical power, water and other pressurized fluids (typically air) that are required during operation of the oscillating hauloff device. Utilities are fed to auxiliary equipment mounted within the moving structure of the oscillating hauloff using a long umbilical cord which is folded back and forth while wrapping around the unit ±180° as the unit cycles. This folding motion stresses the wires and hoses as they flex and causes long term problems with breakage.

SUMMARY OF THE INVENTION

One aspect of the present invention features stacked, oversized and encompassing support rings that give the oscillating haul-off high stability as well as a very low profile. Stacking the rings one on top of each other is important because it provides a high degree of unit stability suitable for mounting auxiliary equipment and prevents any undesirable swaying motion which causes web wander and wrinkling. These rings are made sufficiently large to fully encompass and support the idler rolls and turning bars in positions suitable for use in a horizontal oscillating hauloff. By fully encompassing the idler rolls and turning bars, a low height for the unit is achieved which is ideal for fitting the unit inside of buildings with height restrictions.

Another aspect of the invention features a method of manufacturing ring members with CNC positioned alignment holes in each ring for establishing the location of idler rolls and turning bars ("CNC" refers to computer numerical controlled metal machining apparatus which is well known, per se, in the manufacturing field). This is important because they establish the critical angular relationship between idler rolls and turning bars. CNC equipment can locate to tolerances better than two thousandths of an inch. This enables an extremely accurate film path to be achieved throughout the oscillating haul-off and minimizes web wandering and wrinkling. A second benefit is that these predrilled alignment holes significantly reduce unit assembly time because there is no need for post machining alignment.

Still another aspect of the present invention relates to the combination of hollow encompassing support rings with ball bearings between the upper and lower surfaces of adjacent rings to achieve simple and economical construction. The rings and ball bearings in combination provide for oscillatory motion, accurate positioning and mounting support of idler rolls and turning bars, and a hollow channel for routing the utilities. This simple unitized system is highly economical since the rings directly incorporate all required functions into a single structure and enable all machining to be performed on a single CNC machine at the same time.

Another aspect of the present invention features passing the web between idler rolls and turning bars in a manner that the web approaches a second turning bar from an opposite direction than the direction in which the web approaches the first turning bar. This arrangement of idler rolls and turning bars substantially cancels the wandering effect of the web as it passes through the oscillating hauloff. This is important because there is a natural shift in film position on the turning bar due to friction between the film and the bar. The amount of friction and thus film shifting is related to web tension, film thickness, etc. By bringing the film web around the second turning bar from the opposite orientation, the web shifts by the same amount, but in the opposite direction from the wandering caused by passing over the first turning bar, thus canceling the initial shift. This prevents web wander and minimizes wrinkling.

Another aspect of the present invention relates to zero backlash-driven supporting ring members which maintain precise positional relationships required for the rolls and turning bars to one another, utilizing chains, sprockets and timing belts. This, in simple manner, achieves the very critical respective geometries between the idler rolls and turning bars so that the film exits the oscillating haul-off without wandering back and forth.

The present inventors also discovered that there has been a problem related to turning bar design in that additional wrinkles have been caused by a varying air pressure profile beneath the film as it passes over the bar. One cause for this was found to be due to the arrangement of the drilled hole orifices through the turning bars. The holes in prior devices have been drilled about 1 and ½ inches apart from each other. Directly over each hole there is a localized high pressure area and midpoint between the holes there is lowest pressure. This pressure difference which is exerted on the film causes additional wrinkles in the web.

The second cause for pressure profile induced wrinkles is related to the volumetric flow of air through the turning bar. A film web is floated (lifted) off the surface of the turning bar by creating pressure beneath the web sufficient to overcome the effects of web tension. If pressure drops below float pressure the film drags on the surface of the turning bar causing wrinkles and web wander. The pressure required to float the film is proportional to web tension per inch divided by the radius of the turning bar and typically is 10 to 20 inches of water for a 3 to 4 inch diameter bar. As an oscillating hauloff turns through its cycle, the surface area of the turning bar that the film covers changes significantly. Minimal coverage occurs when all of the turning bars and idler rolls are lined up. Existing turning bar designs incorporate drilled hole orifices of diameter large enough to allow significant volumetric air flow. When these holes are uncovered during some of the cycle, internal pressure is lowered by escape of air. It may go so low as to be less than that required to adequately lift the film off of the turning bars surface causing wrinkles and web wander.

This air pressure variation is compounded by changes in web size. The present state of the art sought to compensate for the change in film width with plugs located inside the turning bar that can be moved in and out according to the web width that is run. But the plugs are rather ineffective because there still exist the changes in surface area covered as the hauloff is oscillated. Additionally, the mechanism for moving the plugs usually rusts due to the presence of moisture and ends up having to be left in one position, usually in the widest position, which makes problems worse when narrow webs are manufactured since air pressure is lost from the ends which are uncovered.

Another aspect of the invention features flow restricted air outlets in the turning bars to maintain uniform film float as changes occur in the surface area covered by film during the oscillating process. It is important to minimize variations in the way the film floats (lifts) off the turning bars since these variations induce film wrinkles and wandering. Incorporating flow restricting air outlets limits the flow of air and ensures the minimum internal turning bar pressure is always higher than what is required to float the film. Such restricted air outlets also allow for an excess pressure to be dissipated across the length of the orifice so the film float is not affected when operating at very high internal pressure.

Still a further aspect of the present invention relates to axially extending air distributing grooves extending outward from each hole on the turning bar surface for more uniform pressure distribution and support of the film. As discussed above, it has been discovered that it is important to minimize variations in the pressure profile under the film since variations will cause unwanted film wrinkling. Directly over each hole there is a localized high pressure area. By cutting a groove outward from the hole and substantially perpendicular to web motion, this pressure is diffused and spread evenly along the film. This prevents pressure variations under the film and does not promote wrinkle formation. This feature acts effectively in concert with the restricted outlets to achieve uniform lifting over a wide range of operating conditions.

A still further aspect of the invention features reinforced turning bars which are mounted to allow axial thermal expansion. This feature is found to prevent turning bar deflections which cause the film to wrinkle and wander. As film wraps around the turning bar, web tension pulls on the bar and tends to deflect it. By attaching a backing bar to add rigidity in the direction of the web tension forces, and providing for thermal expansion, the deflection is substantially prevented. The dimension of the backing bar perpendicular to the direction of deflection is kept slightly smaller than the diameter of the turning bar so as not to interfere with the film. Deflecting forces due to thermal expansion of the turning bars are prevented by incorporating slotted ends which are free to slide on mounting plates. Film temperature is typically 150 degrees Fahrenheit or more and causes the temperature of the turning bar to exceed that of its encompassing ring. By providing thermal expansion slides, the turning bars are prevented from deflecting and causing wrinkling with temperature change.

A further aspect of the present invention features torsionally deflectable utility leads between a fixed supply and the oscillating rings. This is important because utility leads which are torsionally deflected have significantly longer life spans than those that are flexed back and forth. This design limits the torsion to a maximum of 90 degrees which is easily absorbed by standard utility leads such as electrical wiring, air and/or water hoses.

A still further aspect of the present invention relates to a stacked ring oscillating hauloff which is capable of being positioned for receiving blown film in an upward or downward extrusion line configuration. It is important to provide an oscillating hauloff capability for downward extrusion since this arrangement is desired for many processes and there are presently no oscillating hauloffs easily adaptable for this purpose. This is accomplished by maintaining the same frame orientation and reversing the order of the four rings (upside down as a unit). The only required design change is that the ball bearing groove, previously, the lower surface of the level I ring must instead be cut into the upper surface of the level IV ring (before the order of the rings is reversed) and the receiving rings are arranged according to the direction of receiving the film.

A further aspect of the present invention relates to the use of air which is substantially free of polymers in the turning bars and thereby avoiding use of factory air which is laden with volatile short chain, sticky polymer molecules that create blockages inside of the orifices of the turning bar. This is important because blockage of the orifices will result in uneven floatation of the film resulting in film wrinkling and wandering. Mounting the blower stationary allows for drawing air from outside of the building. This outside air does not contain the sticky polymer molecules and thus does not clog up the turning bar holes.

DETAILED DESCRIPTION OF THE PREFERRED EMBODIMENTS

Figure 1:
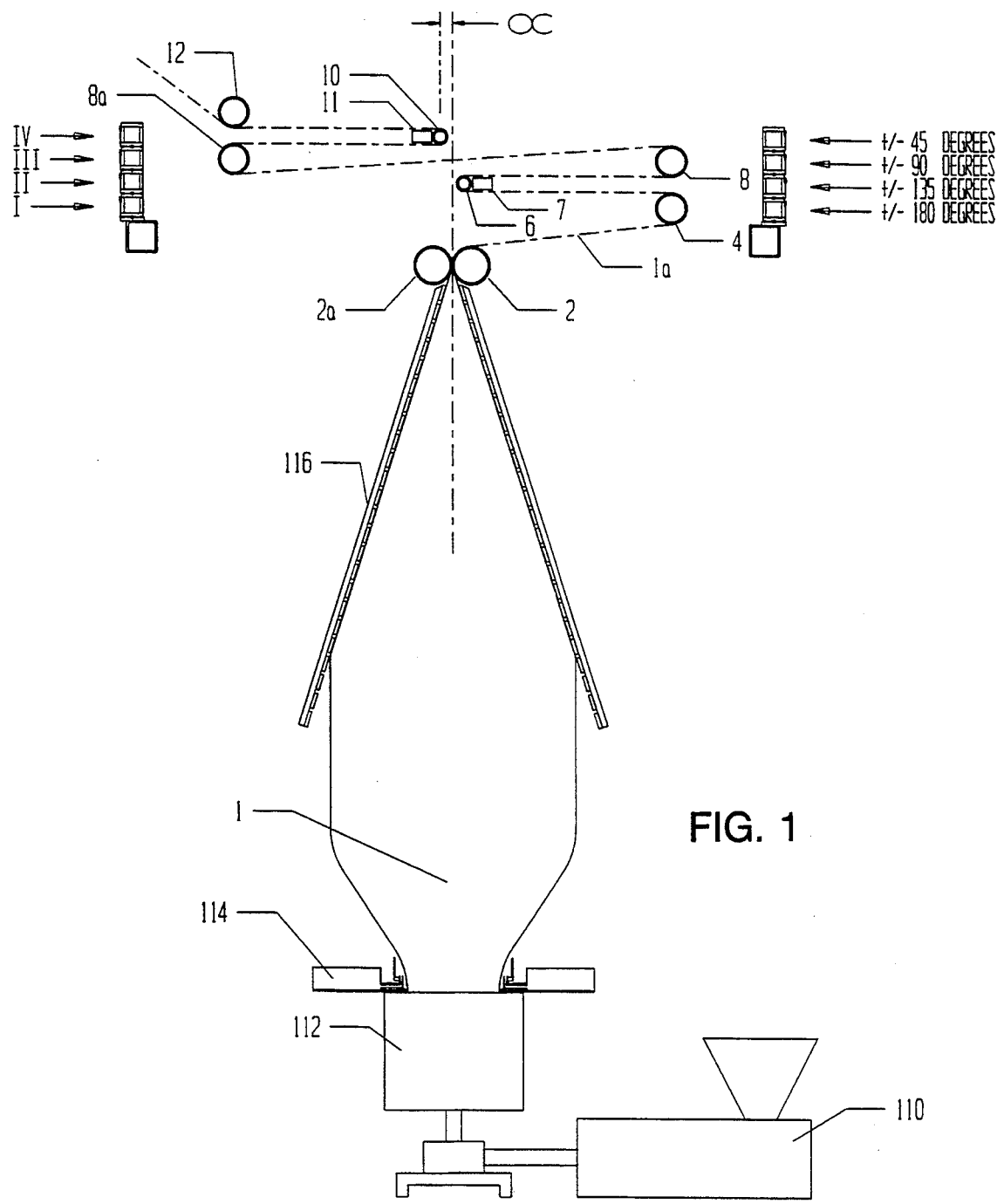
FIG. 1 is a schematic side view shown in cross section of the blown film extruder and oscillating hauloff according to the present invention.

FIG. 1 illustrates a plastic melt that exits extruder 110 and enters the bottom of a blown film die 112. An annular plastic melt issues from the top of die 112 and is continually drawn upward by nip rolls 2 and 2a through cooling ring 114 forming a continuous cylindrical plastic bubble 1. The bubble is converted to a flat sheet of film 1a (also known as layflat) by passing through collapsing shield 116. The film then passes between rubber roll 2a and steel roll 2 which nip together and are motorized to continually pull the film during the extrusion process. The collapsing shield 116 and nip rolls 2 and 2a are attached to ring I (see FIG. 4) which rotates ±180° about the central vertical axis (herein referred to as the "unit axis") of the bubble 1. It is a matter of general practice within the industry that the film travels around steel roll 2 and not rubber roll 2a. The layflat film 1a exits the nip rolls wrapping partially around steel roll 2 and then passes underneath and around idler roll 4 also attached to ring I (see FIGS. 4 and 7). The film 1a then travels horizontally inward towards the unit axis and passes underneath and around turning bar 6.

Turning bar 6 is fixed and attached via several small brackets to and supported by backing bar 7 to prevent deflection by film web tension thereby eliminating this cause of wrinkle formation. Backing bar 7 is slightly thinner vertically than the diameter of turning bar 6 to prevent interference with film 1a. For example, if turning bar 6 is four inches in diameter then a backing bar 7 which is three inches thick may be used. The turning bar/backing bar 6/7 is attached to ring II which rotates ±135° around the unit axis. Turning bar 6 is mounted offset from the unit axis by a distance of $a$, wherein $a = (\pi/2 *$ Turning Bar Radius) to prevent geometrical web wandering. Pressurized air is supplied to the ends of turning bar 6 which exits out small holes for providing a substantially frictionless surface for film 1a to pass over. This will be further described in connection with FIG. 12.

The film 1a then travels horizontally outward and away from the unit axis passing underneath and around idler roll 8 mounted in ring III. The ring III rotates about the unit axis by ±90°. The arrangement of idler rolls 4 and 8 together with turning bar 6 correct for one half of the angular shift in direction of film 1a by this oscillating hauloff unit. The film 1a then travels at a slight downward angle passing through the unit axis, under and around idler roll 8a so attached to ring III. As the film 1a passes idler roll 8a, its direction is reversed and it travels horizontally inward towards the unit axis and passes underneath and around turning bar 10.

Figure 11:
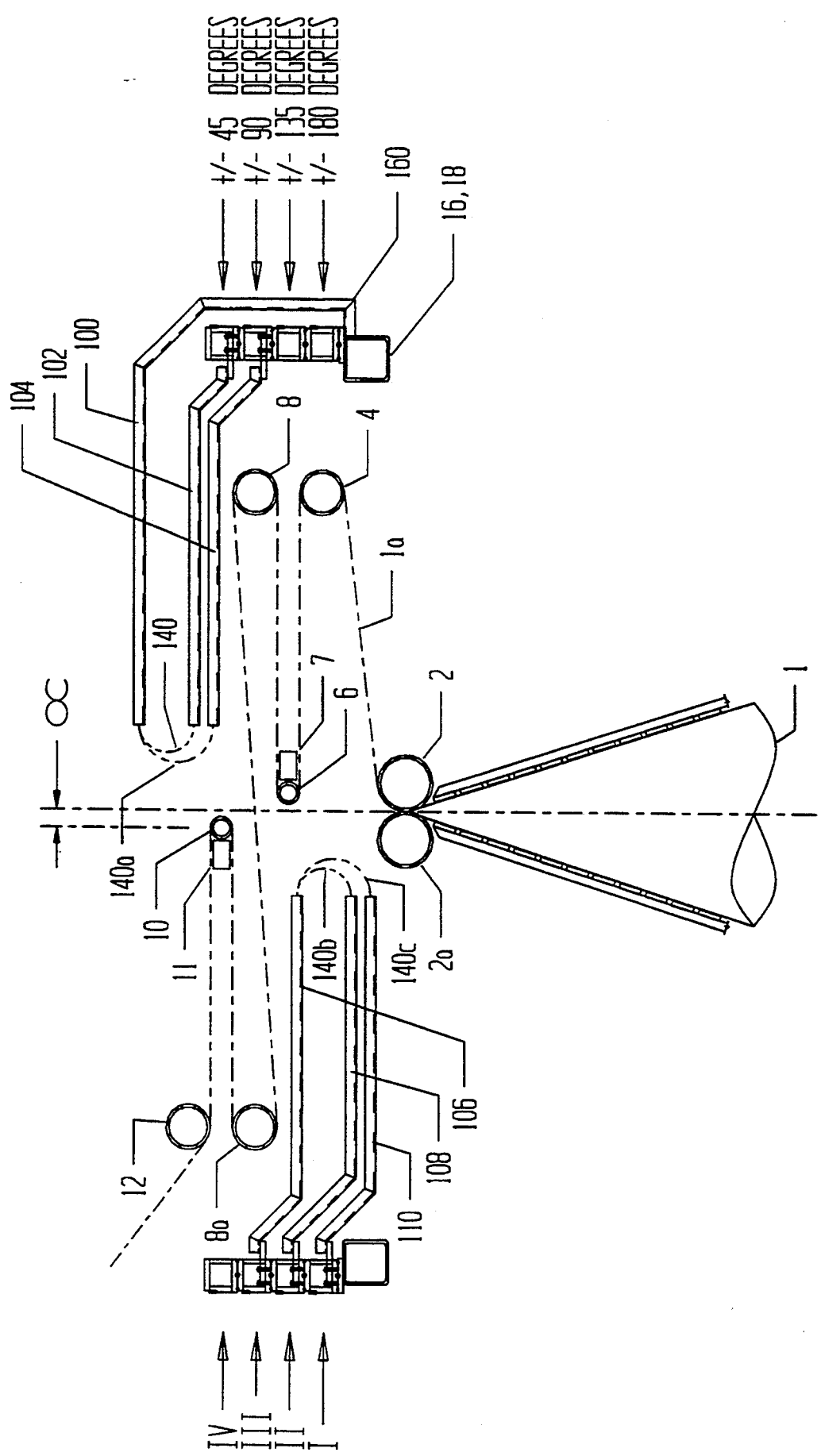
FIG. 11 is a schematic side view showing the arrangement for providing utilities to the oscillating hauloff according to the present invention.

Turning bar 10 is attached to and supported by backing bar 11 and they perform similar functions to turning-/backing bar 6/7. Backing bar 11 is attached to ring IV as seen in FIG. 11. The ring IV rotates about the unit axis by ±45°.

Figure 2:
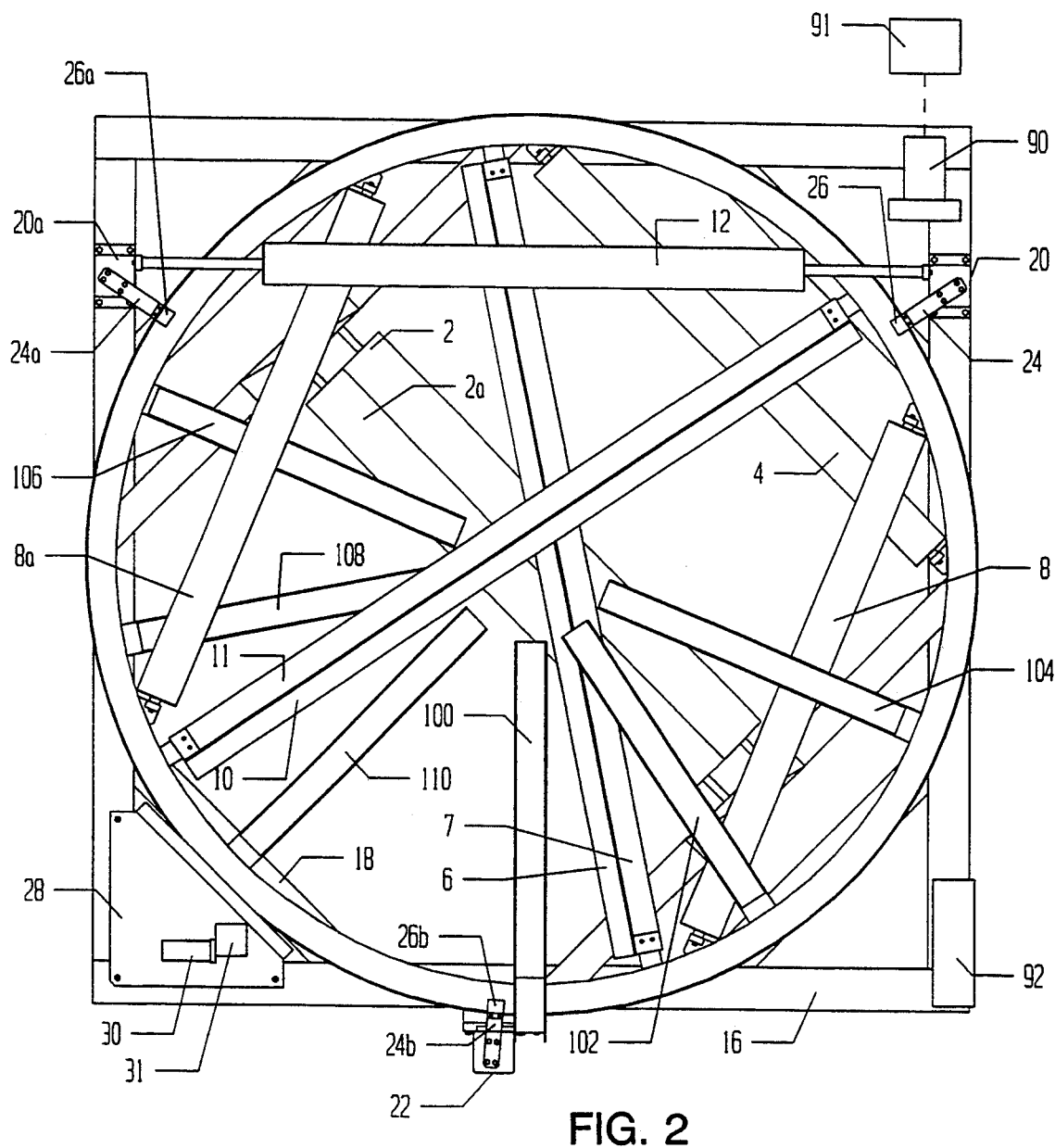
FIG. 2 is a plan view of the oscillating hauloff rotated to 135 degrees.

After passing over the turning bar 10, the film 1a travels horizontally outward and away from the unit axis passing underneath and around idler roll 12 which is mounted in a fixed position on to frame 16 as seen in FIG. 2. The arrangement of idler rolls 8a and 12 together with turning bar 10 correct for the remaining half of the angular shift in direction of film 1a. The arrangement of idler roll 8 and 8a cause the turning bars 6 and 10 to be approached by film 1a from opposite directions thereby effectively canceling the frictional web wandering that has occurred on turning bars in prior systems as will be described in further detail below.

Figure 2A:
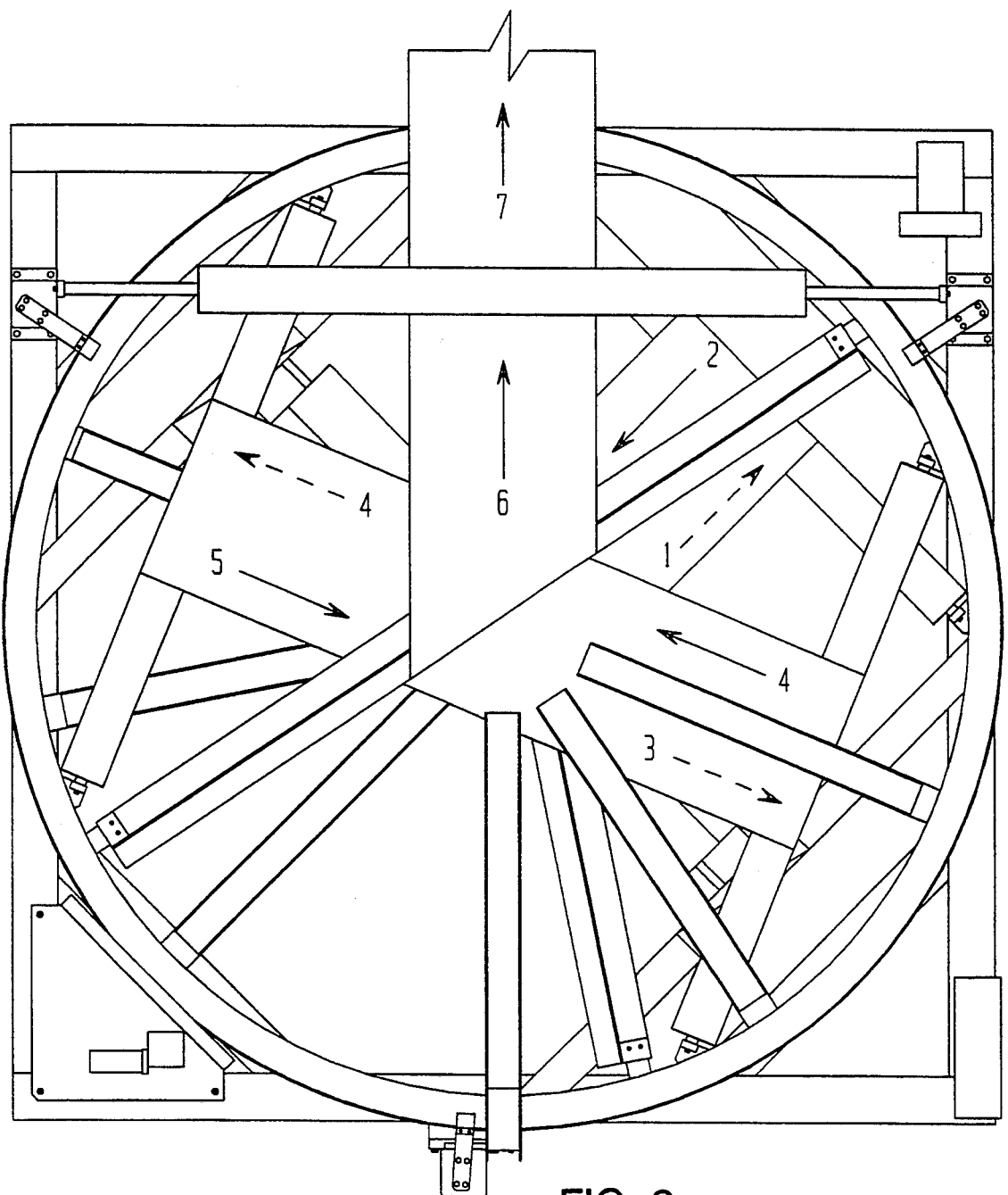
FIG. 2a is a plan view similar to FIG. 2 illustrating the blown film disposed in the oscillating hauloff.

FIGS. 2 and 2a are plan views of the oscillating hauloff with ring I shown after being rotated 135°. FIG. 2 illustrates the oscillating hauloff without the film 1a and FIG. 2a illustrates the oscillating hauloff with the film 1a shown passing over the idler rolls and turning bars.

Ring I is fully supported by frame 16 and its associated cross supports 18. The assembly of four stacked rings is held firmly in place by hold-down arms 24, 24a and 24b and rollers 26, 26a and 26b which are bolted to rigid vertical columns 20, 20a and 22. The precise positioning of each ring is maintained by a drive unit (see FIG. 5) including a motor 30 and a gear box 31 that are mounted on a top plate 28. The drive unit is controlled by an electrical panel 92 that is mounted on another corner of the frame 16.

As shown in FIG. 2a, the film direction is indicated by direction arrows which are dashed if the film is traveling in a path which is hidden from sight in this view and solid if the film can be seen in this view. As the film 1a passes over steel roll 2 it heads toward idler roll 4, as shogun by arrow 1. The film 1a then passes underneath and around idler 4 and inward as shown arrow 2.

Turning bar 6 is at a relative angle of 33.75° to idlers 4 and 8. Film wraps 180° underneath and around turning bar 6 and travels outward toward idler 8 as shown by arrow 3, for a total turning angle of 67.5°. The film is brought to the opposite side of the unit axis after first wrapping around idler 8 and travelling through the unit axis as shown by arrow 4. Film then wraps around idler 8a and travels inward as shown by arrow 5 and approaches turning bar 10 from an opposite orientation to that direction which the film approached turning bar 6. Turning bar 10 is at a relative angle of 33.75° to idler 8a. The film 1a then wraps 180° underneath and around turning bar 10 and travels outward toward idler 12, as shown in arrow 6, for a second turning angle of 67.5°. This yields a total combined shift in web direction of 135° which exactly compensates for the rotated position of the nip rolls.

As the film 1a passes around turning bars in general, there exists a natural tendency for film to shift position on the bar. These shifts occur on turning bars 6 and 10, however the opposite directions of the approach facilitated by the presence of idler rolls 8 and 8a cause shifts in opposite directions which act to exactly cancel this film wandering. The combination of angular compensation (135° in this case) and opposite direction of attack on the turning bars allows for the film to exit the oscillating hauloff on a stationary idler 12 without web wander.

Pressurized air for the turning bars is provided by blower 90 mounted fixed to frame 16. Clean air is drawn from outside of the plant (as schematically illustrated at 91) and is fed to the turning bars via blower 90 thereby avoiding having to use air from inside the plant which contains sticky polymers. These polymers have a tendency to plug the air out, lets in the turning bars. It is also contemplated that other sources of clean air such as from a suitable filtering system may be used for this purpose. This air together with other utilities such as electrical, compressed air and water are routed to each level using utility arms 100,102,104,106,108 and 110 and these will be describe in detail in FIG. 12.

Figure 3:
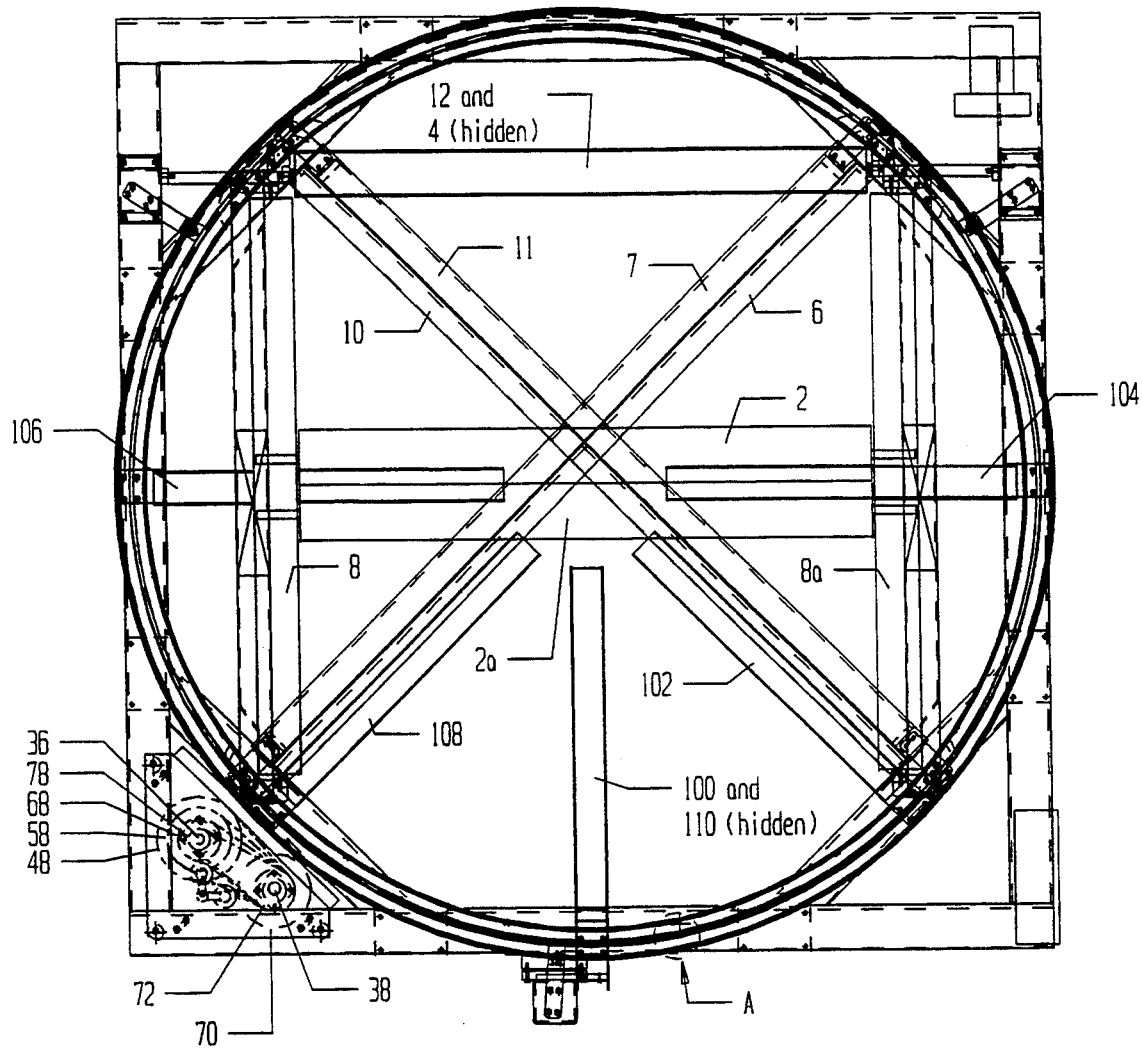
FIG. 3 is a plan view including a section partially broken away illustrating the oscillating hauloff rotated to the 180 degree position.

FIG. 3 illustrates the oscillating hauloff rotated to the 180 degree position. Drive shafts 36, 38 and pulleys 48, 58, 68 and 78 as well as sprocket 70 can be seen. The operation of these elements will be described further in connection with FIG. 5.

Figure 3A:
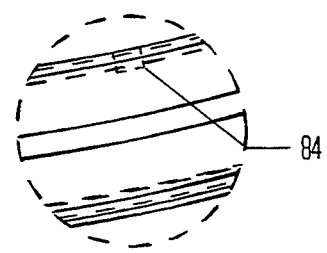
FIG. 3a is an enlarged view of a portion of the ring shown in FIG. 3.

FIG. 3a illustrates an enlarged scale section of a ring taken in area A showing one of the internal ring supports 84 as well as the grooves cut in the ring for the ball bearings and seals. These internal ring supports 84 add rigidity to the rings without significant weight penalties.

Figure 4:
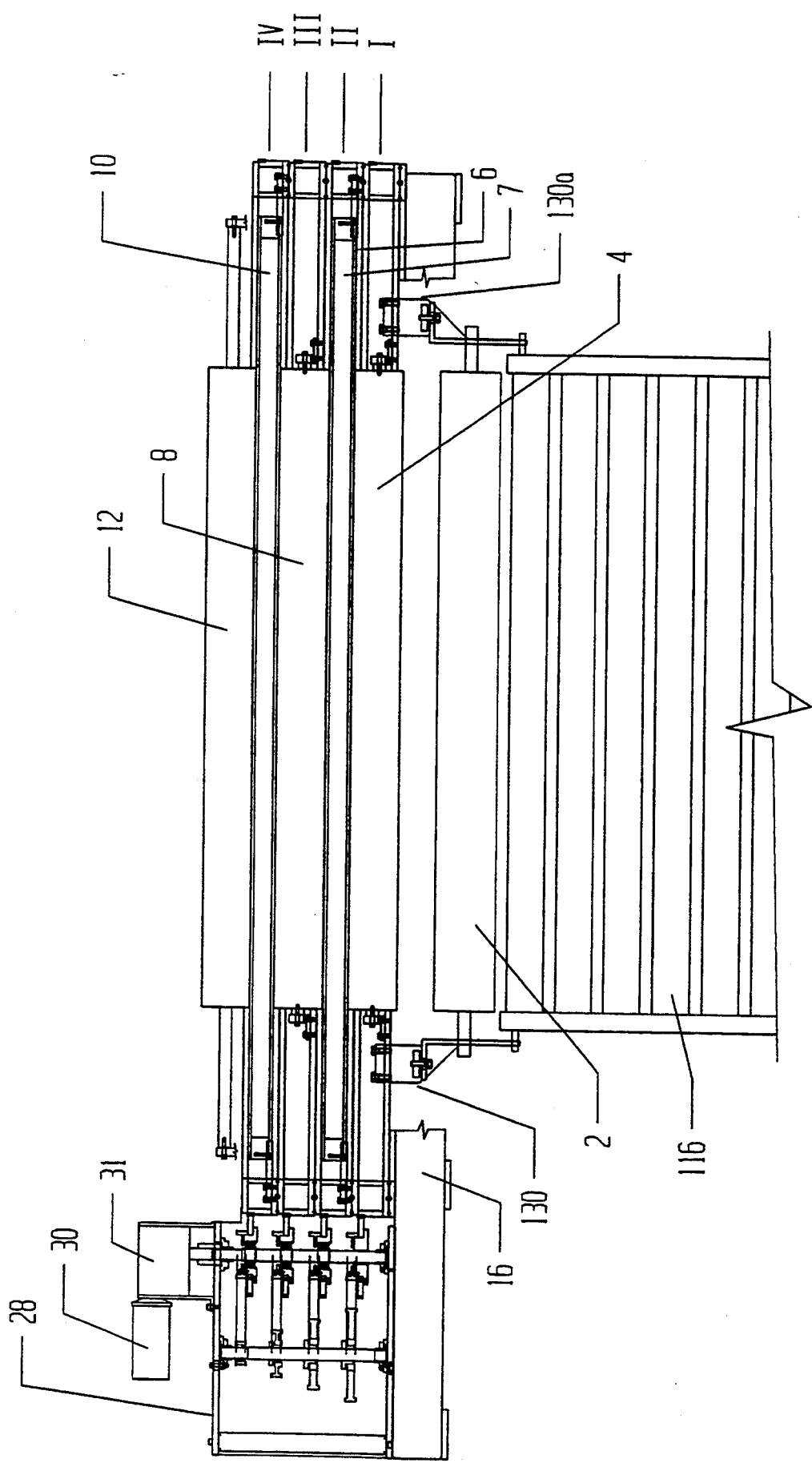
FIG. 4 a side view, shown in cross section, showing the oscillating hauloff including the driving mechanism according to the present invention.

FIG. 4 shows the compactness of the oscillating hauloff unit. The nip rolls 2 and 2a are suspended from cross members 130 and 130a which are rigidly mounted to ring I. The rigid structure 130 and 130a created for supporting nip rolls 2 and 2a has sufficient strength and versatility to allow for mounting equipment and the associated framework a processor might select. The nip rolls 2 and 2a can be located at any distance below ring I so long as they remain parallel to idler 4.

Idler 4 is fully encompassed by and vertically located in the center of ring I just as turning bar 6/7, idlers 8/8a and turning bar 10/11 are encompassed by and mounted in the center of rings II, III and IV respectively. Turning bar 6 is located adjacent to idlers 4 and 8/8a and turning bar 10 is adjacent to idlers 8/8a and 12. The center to center distance between adjacent rings is calculated by adding the radii of the associated turning bar and idler roll(s). For instance, if turning bars are 4 inches in diameter and idler rolls are 8 inches in diameter then the center to center distance between rings would be (4/2+8/2)=6 inches. This adjacent, stacked design allows for obtaining minimum overall unit height. The rigidity and versatility of the unit allow for the use of pre-existing nip rolls and collapsing shields and unit compactness allows for installation where vertical height is restricted.

Figure 5:
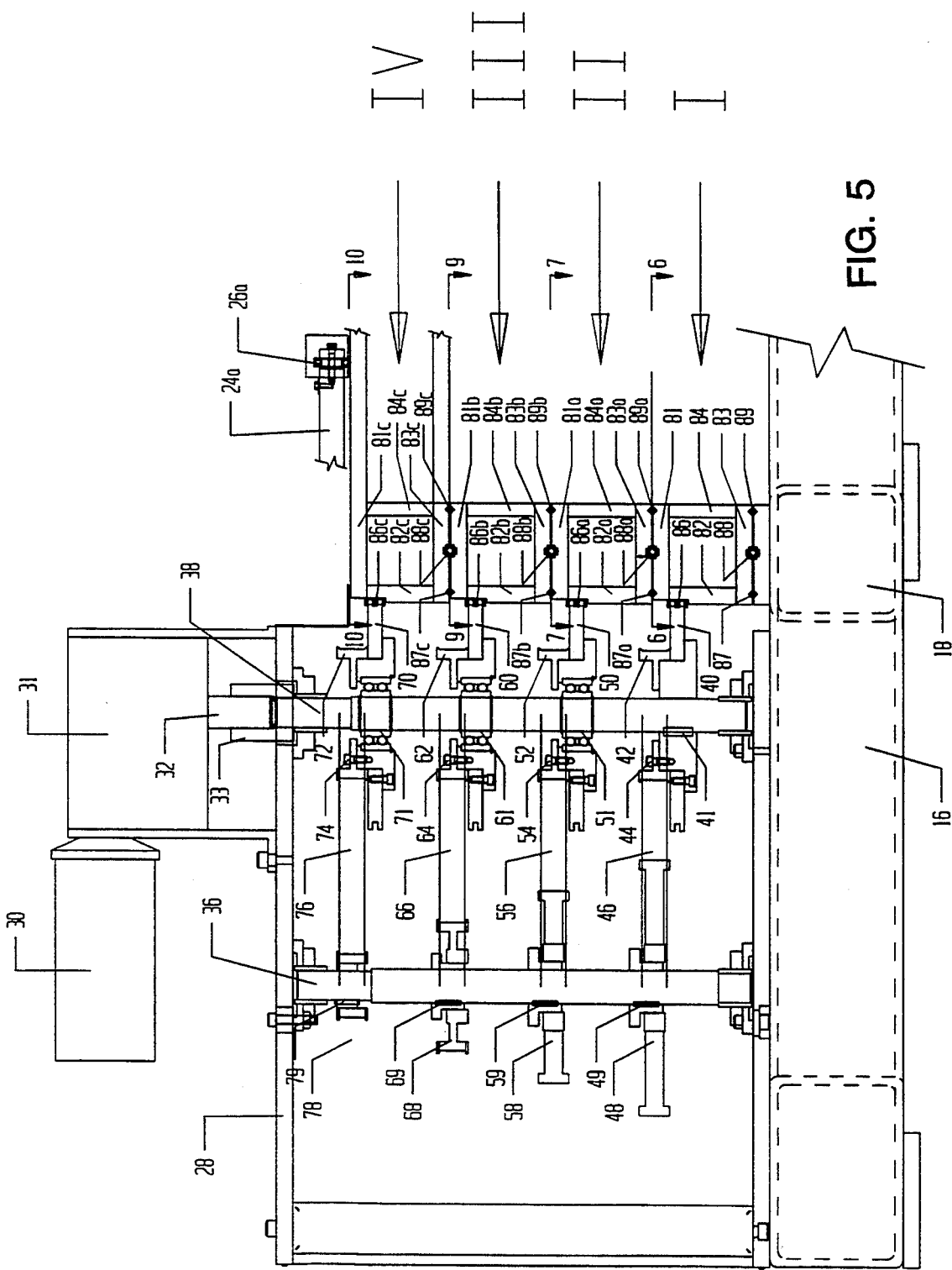
FIG. 5 is an enlarged side view of the drive mechanism of the oscillating hauloff according to the present invention.

FIG. 5 illustrates the drive mechanism of the oscillating hauloff. Ring I consists of top plate 81, outer plate 82, bottom plate 83 and internal ring supports 84. Internal ring supports are vertical posts at multiple locations around the inside edge the ring which provide structural rigidity. Mounting brackets for idler rolls and turning bars are attached to flat machined surfaces inside the rings for proper alignment. Ring II, III and IV have similar elements which are designated with an "a", "b", and "c" respectively.

Ring II's bottom plate 83a rests on top of ball bearing 88a which rests on top of ring I's top plate 81 and both are free to move relative to one another. This arrangement exists between adjacent rings and allows each to move independently. Frame 16 has included with it a circular plate similar to plate 81 and ball bearing 88 which allows ring I to rotate on the frame.

The frame includes a ring hold-down arm 24a which pushes down through roller 26a on ring IV to hold the rings properly in place on top of frame 16.

Power is transferred from motor 30 into gear box 31 and through drive shaft 32 connecting vertically downward through coupling 33 to shaft 38. Shaft 38 transfers the power through key 41 into sprocket 40 which engages with chain 86. Chain 86 is disposed around and is attached to ring I and thus power driving the sprocket is transferred to the chain 86 to drive ring I. Power is also transferred from sprocket 40 through bolts 44 to pulley 42, timing belt 46 and on to pulley 48, which key 49 locks to shaft 36. Shaft 36 powers ring II through key 59, pulley 58, timing belt 56, pulley 52, bolts 54 and sprocket 50 which is mounted on shaft 38 using bearing 51 to allow independent rotation. Sprocket 50 engages chain 86a which drives ring II similar to ring I. Ring III is driven similar to ring II using key 69, pulley 68, timing belt 66, pulley 62, bolts 64 and sprocket 60. Ring IV is driven similar to rings II and III using key 79, pulley 78, timing belt 76, pulley 72, bolts 74 and sprocket 70. Pulleys 48, 58, 68, and 78 provide for gear reduction and yield a speed ratio of 4:3:2:1 for rings I, II, III and IV respectively. Pulleys, timing belts, sprockets and chains are used because they exhibit zero backlash and therefore act to precisely locate each ring and maintain their critical angular relationships which prevents web wander and wrinkling.

Figure 6:
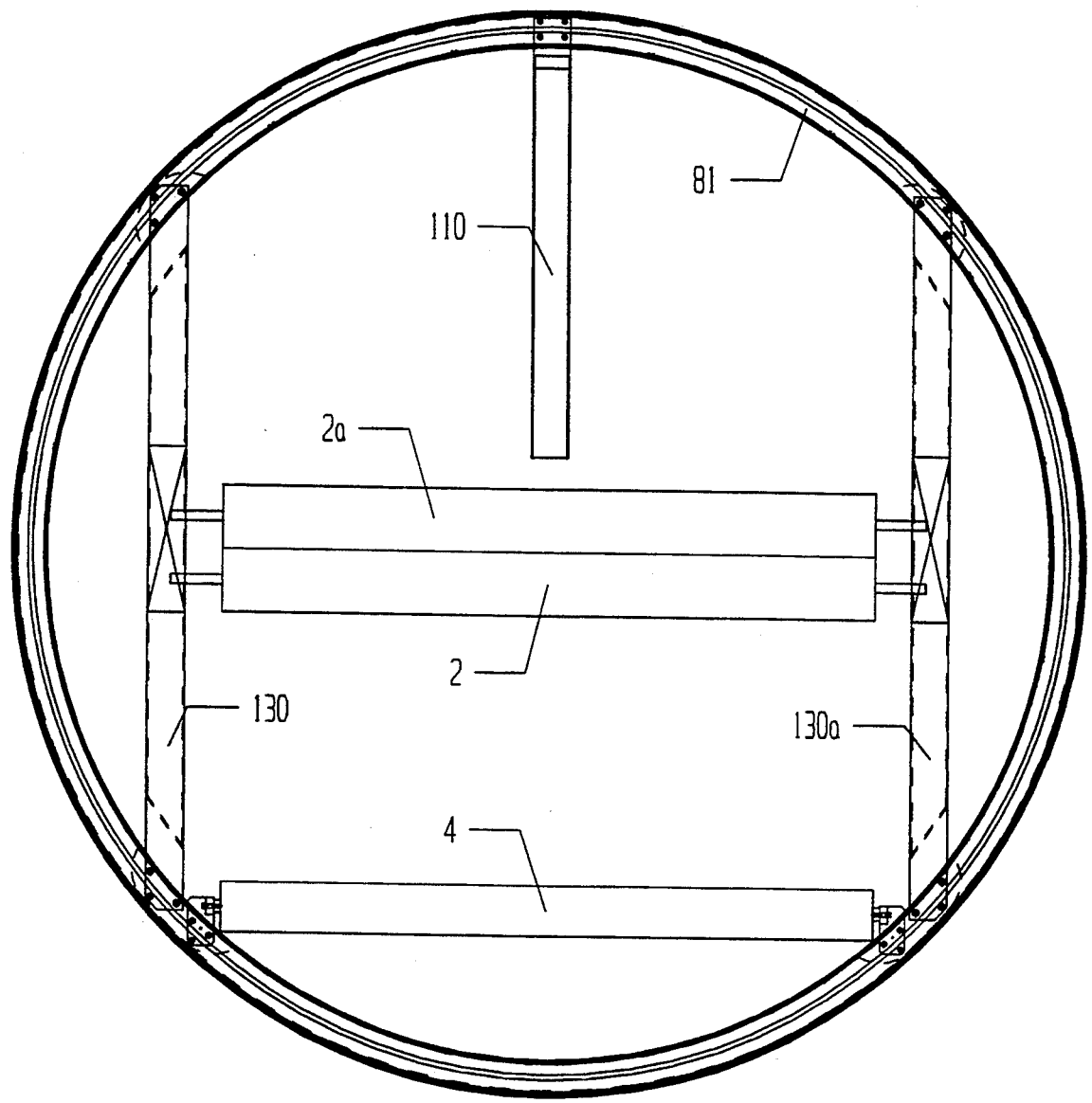
FIG. 6 is a plan view showing the ring member of level I taken along line 6—6 of FIG. 5.

FIGS. 6, 7, 9, and 10 are sectional top views of each ring. FIG. 6 shows ring I to which is attached nip rolls 2 and 2a via support beams 130 and 130a, idler roll 4 and utility arm 110.

Figure 7:
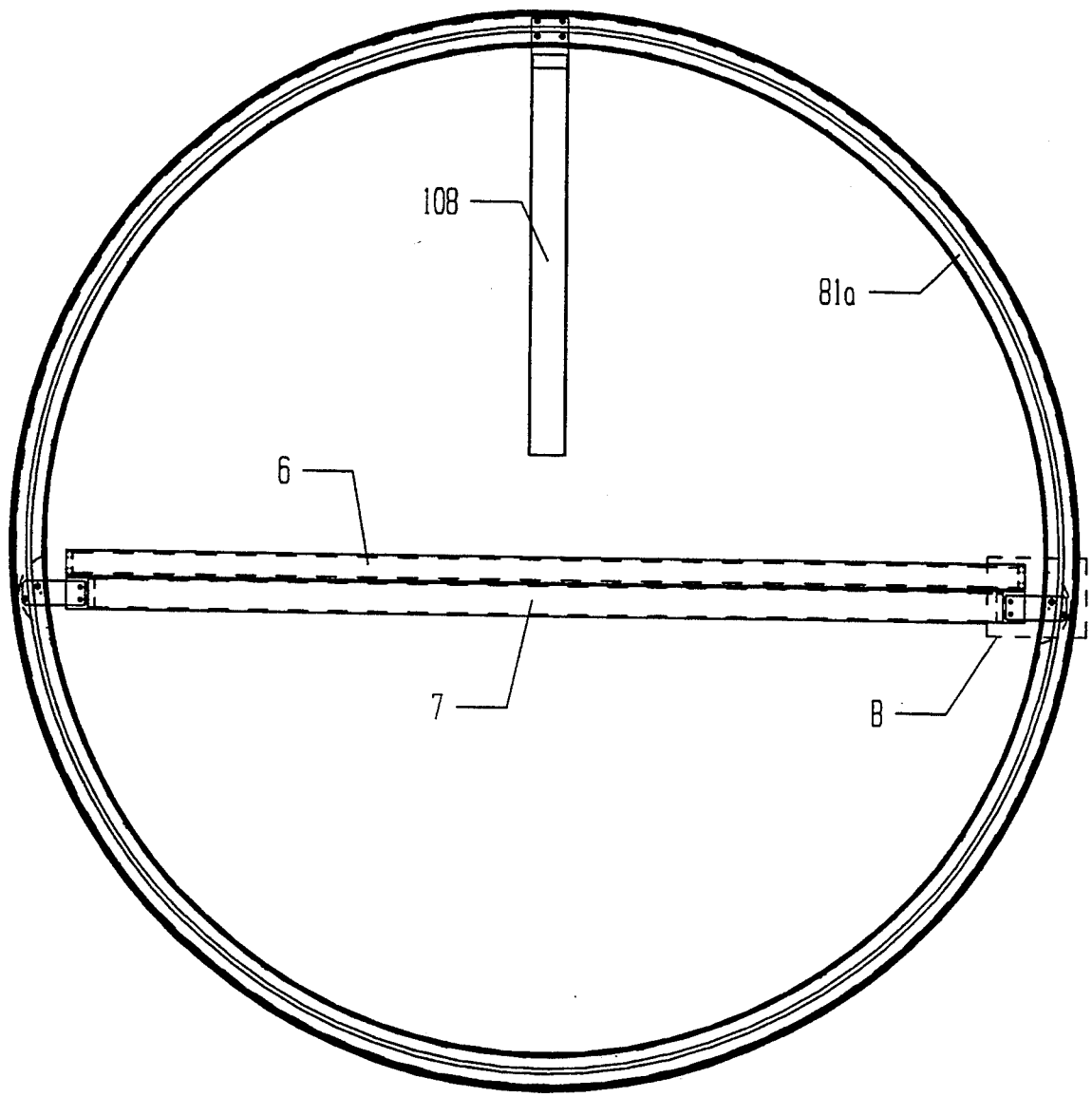
FIG. 7 is a plan view showing the ring member of level II taken along line 7—7 of FIG. 5.

FIG. 7 shows ring II to which is attached turning bar 6 via backing bar 7 and utility arm 108.

Figure 8:
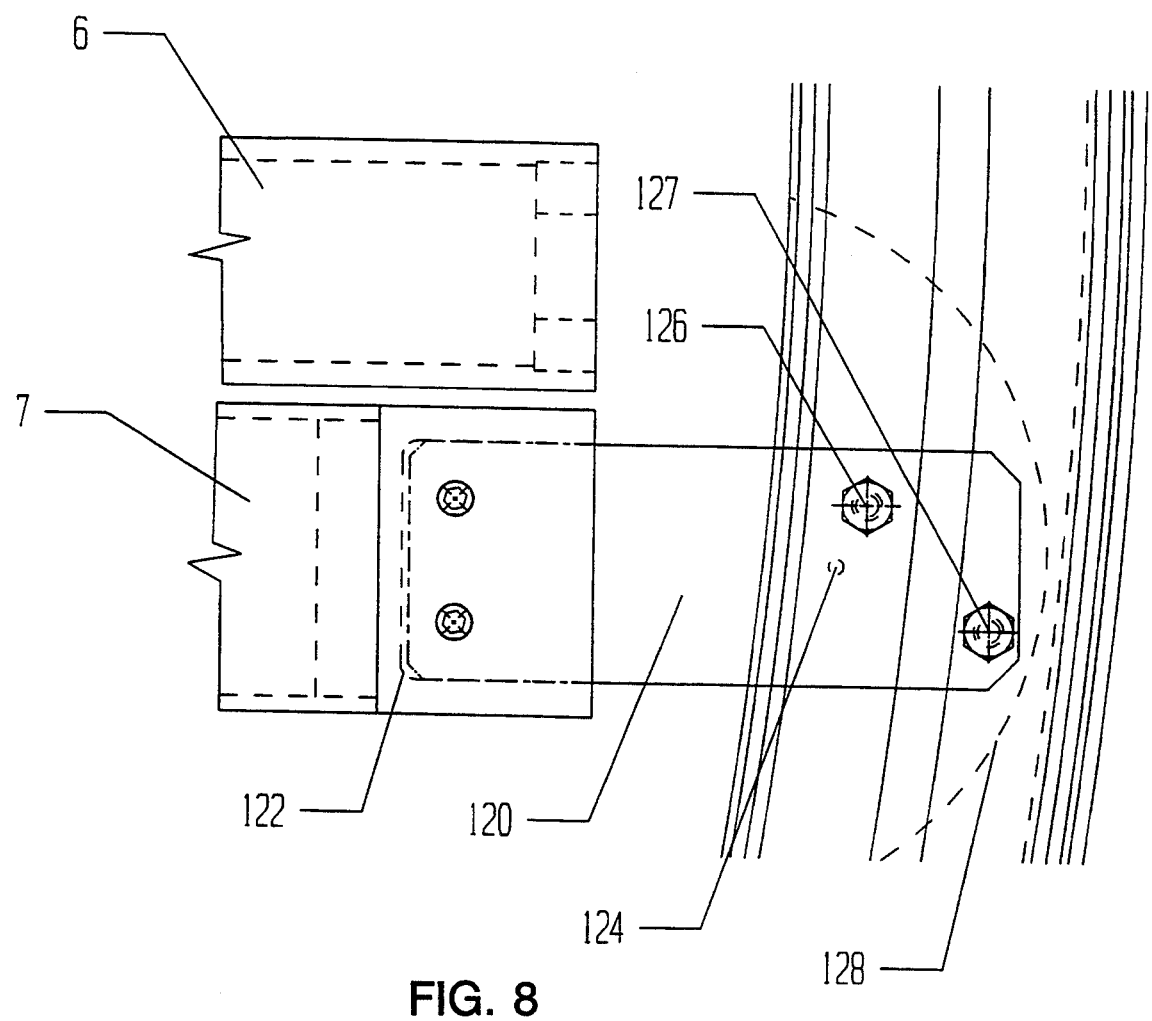
FIG. 8 is an enlarged view of the mounting of the backing bar to the ring member shown in FIG. 7.

FIG. 8 illustrates the connection for mounting the backing bar 7 to ring II taken along area B in FIG. 7. This mounting of the backing bar allows axial thermal expansion because of slot 122 which allows mounting plate 120 to slide back and forth as the turning/backing bar heats up and thus this prevents turning bar deflection.

CNC located hole 124 is precisely drilled in plate 120 and ring II and precision surface 128 is machined into the ring II which act together with bolts 127 and 128 to provide very accurate positioning of the backing bar 7 and thus of the turning bar 6. Low deflection turning bars and accurate positioning act independently to prevent web wander and wrinkles. CNC machines are used to similarly locate all idler rolls and turning bars.

Figure 9:
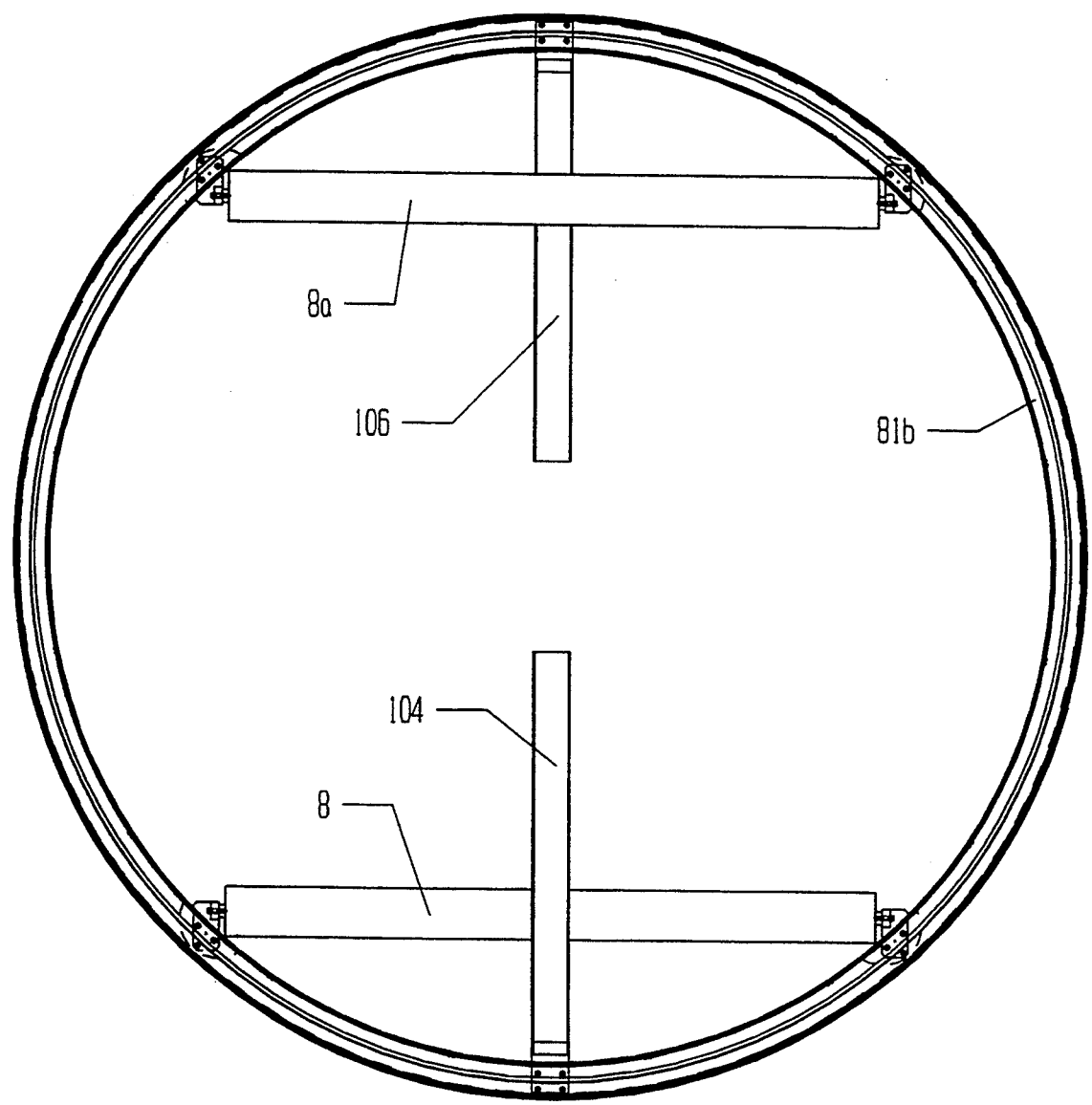
FIG. 9 is a plan view showing the ring member of level III taken on line 9—9 of FIG. 5.

FIG. 9 shows ring III to which is attached idler rolls 8/8a and utility arms 104/106.

Figure 10:
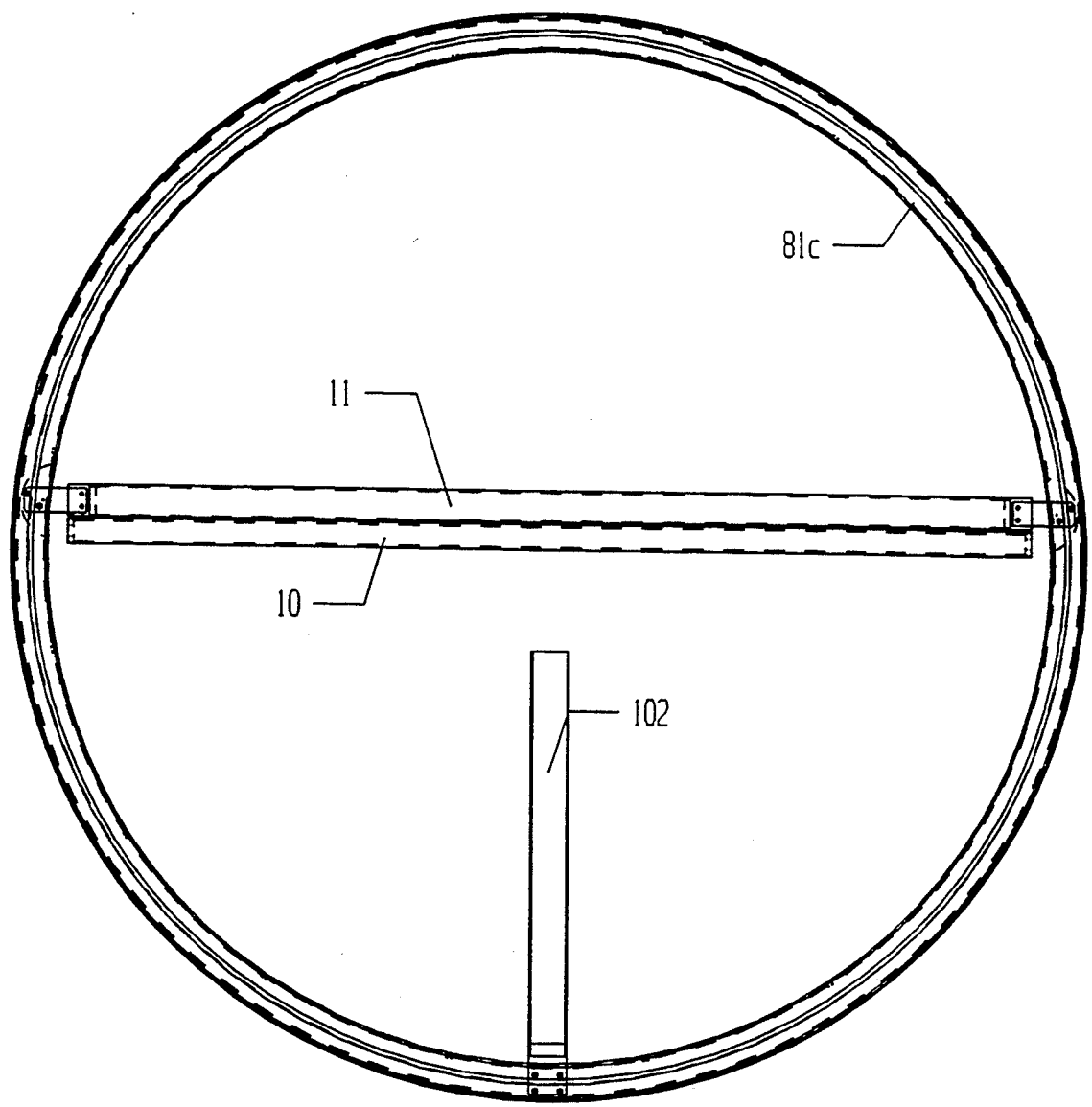
FIG. 10 is a plan view showing the ring member of level IV taken on line 10—10 of FIG. 5.

FIG. 10 shows ring IV to which is attached turning bar 10 via backing bar 11 and also shows utility arm 102.

FIG. 11 is a side view of the utility distribution system. Utilities including electrical, water and air services are required for proper operation of oscillating equipment. Starting at stationary frame 16, the utilities are attached to utility arm 100 which brings the utilities inward toward the unit axis. Just prior to reaching the unit axis, utility arm 100 ends and the now free, torsionally deflectable utility leads 140 and 140a arc separately downward to utility arms 102 and 104 and twist $\pm 45°$ and $\pm 90°$ respectively about the unit axis as the hauloff oscillates. This twisting action is readily absorbed by the utility leads and is far superior to folding action which tends to break them over time due to fatigue.

Utility arm 102 is attached to ring IV and holds pressurized air hoses for turning bar 10. These hoses are routed within the structure of the rings between plates 81c, 82c, 83c and internal ring support 84c to either or both ends of turning bar 10 (the backing bar can also act as a plenum for the turning bar).

Utility arm 104 is attached to ring III and holds all services required for lower levels. Services are routed around ring III through the internal ring structure, 180° and pass into attached utility arm 106. Utilities are arranged within utility arm 106 and pass inward toward the unit axis. Just prior to reaching the unit axis, utility arm 106 ends and the now free, flexible utility leads 140b and 140c arc separately downward to utility arms 108 and 110 and twist $\pm 45°$ and $\pm 90°$ respectively about the unit axis as the hauloff oscillates.

Utility arm 108 is attached to ring II and holds pressurized air hoses for turning bar 6. These hoses are routed similar to ring IV.

Utility arm 110 is attached to ring I and holds all services required by the nip rolls 2 and 2a and any other auxiliary equipment attached to ring I.

Figure 12:
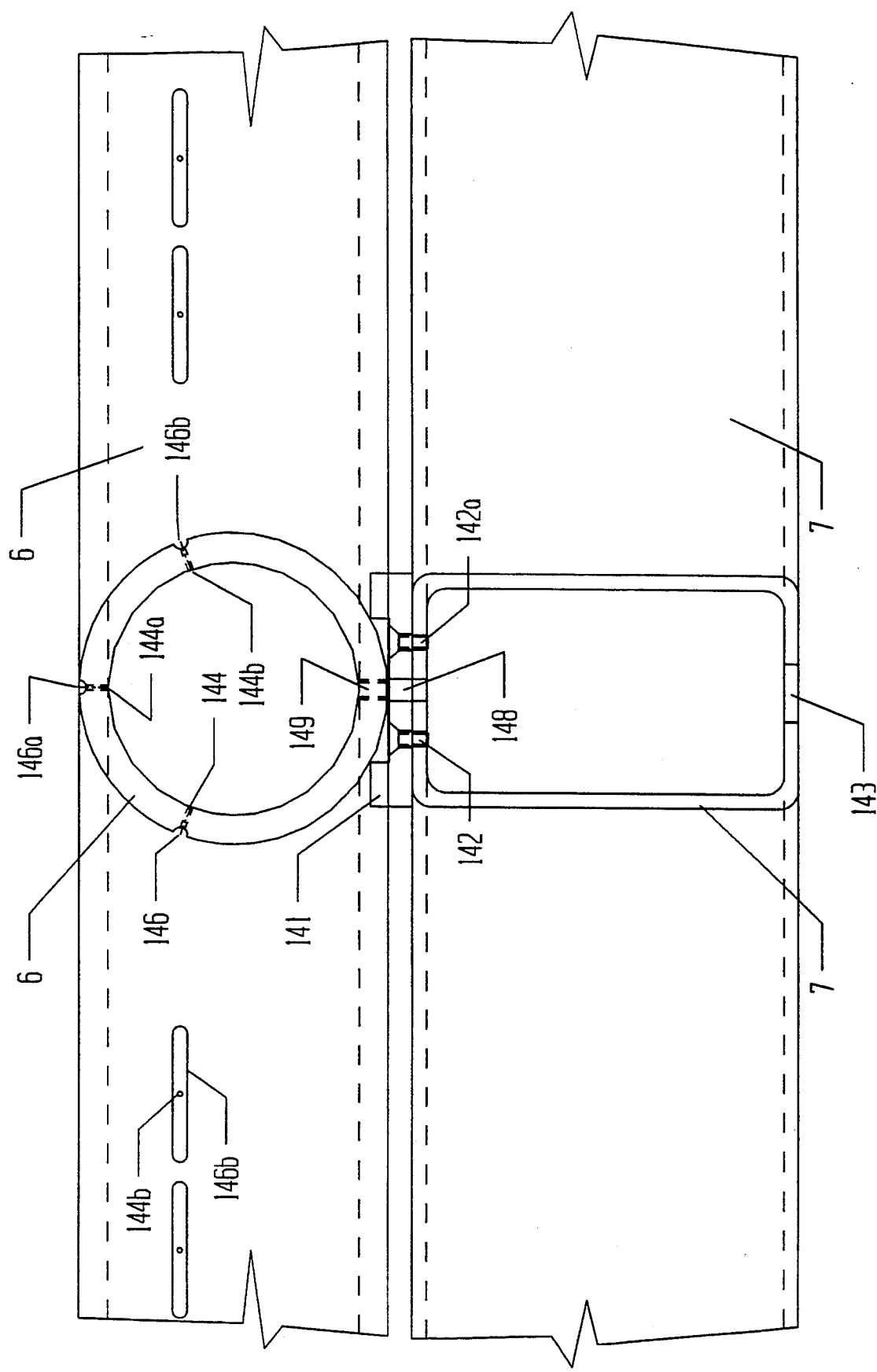
FIG. 12 is a side view and cross sectional view of the turning bar and backing bar according to the present invention.

FIG. 12 shows side and cross sectional views of axially extending air distributing channels or grooves 146, 146a and 146b extending outward from each hole 144, 144a and 144b in the surface of turning bars 6 and 10. These small holes and axial channels provide for more uniform pressure distribution and support of the film and significantly reduce wrinkling. Air flows out through the hole in the center of the channel which has a diameter small enough (between about 1/32 and 3/32 of an inch) to restrict the flow to a minimum yet allow pressure to exert on the film. The film acts like a seal on top of this channel and due to the depth of the channel, air is free to distribute itself. The channel typically does not extend the full length of the turning bar since air would leak out at the edges of the film. Interruptions in the grooves (i.e. providing a plurality of channels) allows for the pressure to be sealed in and are thus more effective at floating the film. Other types and shapes of channels are possible and are contemplated.

Backing bar 7 and 11 are attached to turning bar 6 and 10 respectively using "C" spacers 141 which have a channel (about 0.010 inches) slightly deeper than that required to mate with the turning bar. This arrangement allows for a securing bolt to screw through clearance hole 148 and into threaded hole 149 pulling the turning bar snugly into the channel providing for turning bar rigidity. There are a multiplicity of "C" spacers 141 arranged along the length of the bars and each spacer is fixed to the backing bar by screws 142 and 142a. Access is provided to the securing bolts via holes 143 drilled opposite to holes 148 in the respective backing bars 7 and 11.

Figure 13:
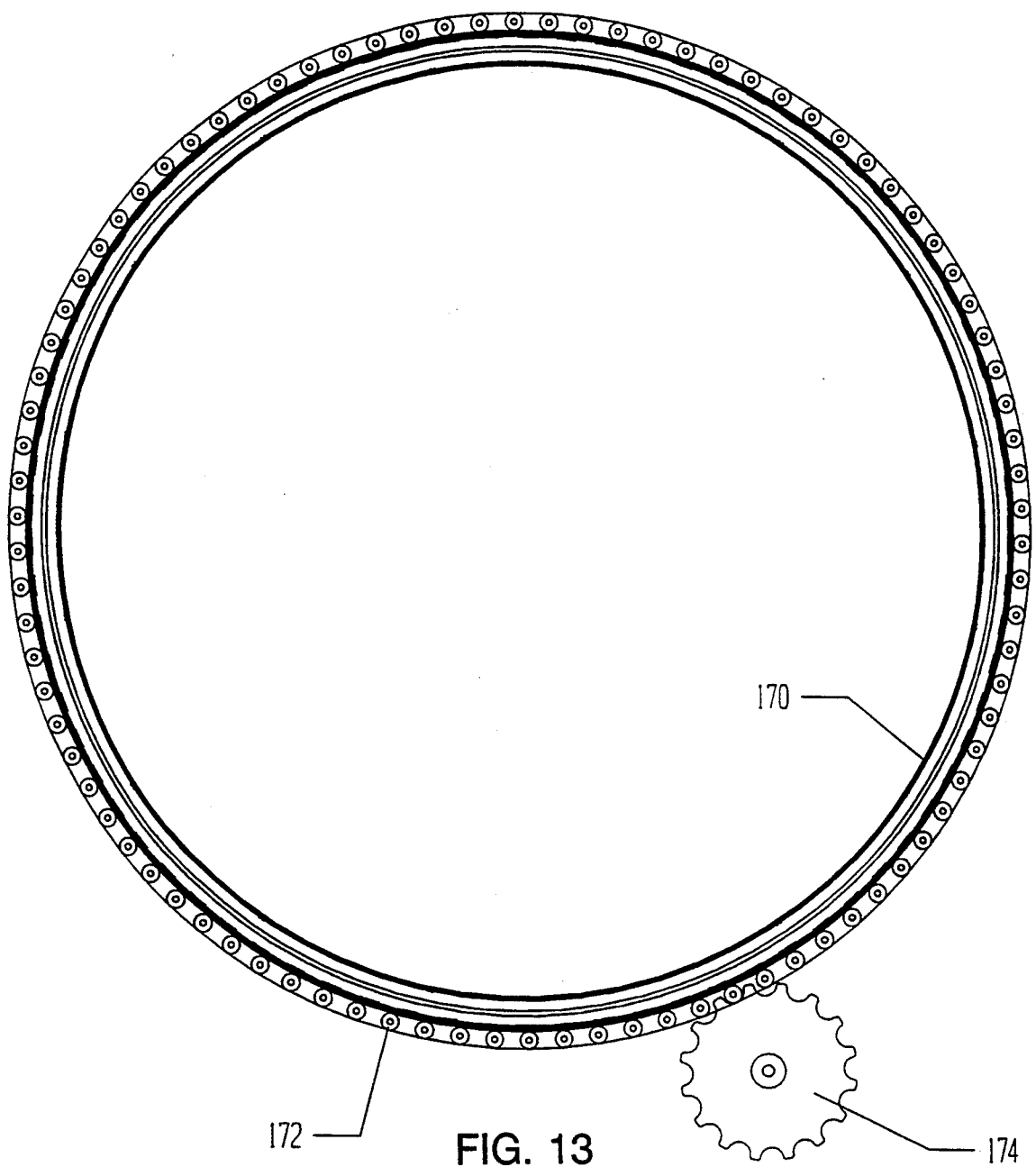
FIG. 13 is a plan view showing a ring member with an enlarged chain and sprocket assembly.

FIG. 13 shows a plan view of a typical ring member with chain 172 and sprocket 174 enlarged relative to the ring member 170 for clarity. Chain 172 wraps around and is rigidly attached to the ring and is engaged by sprocket 174. As sprocket 174 turns, chain 172 causes the ring to be driven with zero backlash afforded by the proper mesh of sprocket 174 and chain 172.

Figure 14:
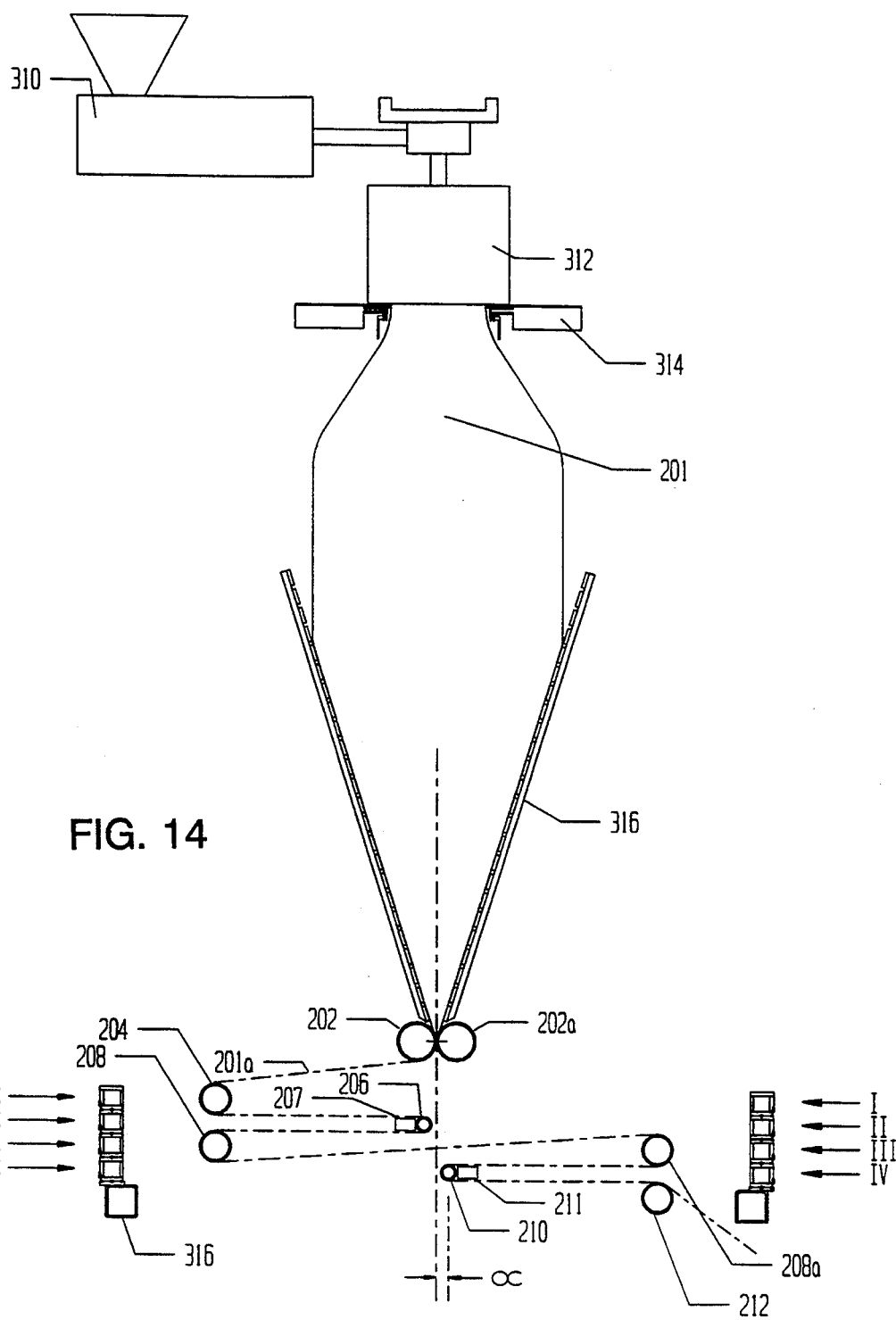
FIG. 14 is a schematic side view shown in cross section of the blown film extruder and oscillating hauloff arranged for downward extrusion according to another embodiment of the present invention.

FIG. 14 shows a blown film extrusion line with an oscillating hauloff arranged for downward extrusion. Plastic melt exits extruder 310 and enters the top of a blown film die 312. An annular plastic melt issues from the bottom of die 312 and is continually drawn downward by gravity and nip rolls 202/202a through cooling ring 314 forming a continuous plastic bubble 201. The bubble is converted to layflat film 201a by passing through collapsing shield 316. The film then passes between rubber roll 202a and steel roll 202 which nip together and are motorized to continually pull the film during the extrusion process. The function of this oscillating hauloff arrangement is the same as described in FIG. 1 except the rings are inverted with ring I on top and ring IV on bottom. Ring IV is allowed to rotate on frame 316. All components within the oscillating hauloff function the same and are numbered similar to FIG. 1 except 200 has been added to each reference numeral in FIG. 1 for the components in FIG. 14. The film 201a exits underneath frame 316 and is processed in the normal way.

The present invention has been described in connection with certain structural embodiments and it will be understood that various modifications can be made to the above-described embodiments without departing from the spirit and scope of the invention as defined in the appended claims.

What is claimed is:

1. An oscillating hauloff device for a blown film line wherein an assembly of idler rolls and turning bars rotatably shift their relationship to one another over time in a predetermined manner to enable the film to have gauge variations distributed back and forth across the width of the flattened film residing in the film path between first and second turning bars, first and second idler rolls spaced from each other on opposite sides of the axis of rotation of the mechanism such that the film path extends between said idler rolls across said axis and passes from said first turning bar around said first idler roll and then around said second idler roll in such a manner that the film in said path approaches said second turning bar from the opposite direction from which the film approaches said first turning bar, whereby the wandering effect of the film produced by passing over the fixed surface of said first turning bar is substantially canceled by the opposite wandering effect produced by passing over the fixed surface of said second turning bar, a plurality of ring members sized to surround the path of the film to be produced by the blow film line, the ring members being stacked to rest upon each other, each said ring member being rotatable with respect to its adjacent ring members and selected ring members carrying said idler rolls and turning bars, each said idler roll and turning bar being of a length to fit within the respective ring member and located so that the assembly of stacked ring members substantially encloses said idler rolls and turning bars.

2. An oscillating hauloff device as defined in claim 1, further comprising means for driving said ring members with substantially zero backlash.

3. An oscillating hauloff device as defined in claim 2, wherein said means for driving said ring members includes a respective chain secured to a peripheral surface of each said ring member and a respective sprocket disposed for driving said chain attached to said ring member.

4. An oscillating hauloff device as defined in claim 3, further comprising timing belts and pulleys for driving the sprockets at different predetermined speed ratios.

5. An oscillating hauloff device as defined in claim 1, further comprising torsionally deflectable utility leads disposed between fixed supply means and said ring members for supplying utilities such as power and pressurized fluid to the oscillating hauloff device, said leads arranged so that rotation of said rings relative to said fixed supply means is accomplished by torsional deflection of the leads.

6. An oscillating hauloff device as defined in claim 5, wherein said utility leads are supplied radially inwardly from said fixed supply means to substantially the center of the oscillating hauloff device and then are directed radially outwardly to selected ring members.

7. An oscillating hauloff device as defined in claim 6, wherein said utility leads are carried on a first support member toward the center of the oscillating hauloff device and are carried on a second support member attached to one of said ring members for supplying said utility leads to said ring member, said first and second support members being separated in the direction of the axis of the ring assembly to accommodate rotation between said ring members and allow torsional deflection of said utility leads upon rotation of said ring members.

8. An oscillating hauloff device as defined in claim 1, wherein the dimensions of said idler rolls and said turning bars in the direction of the axis of said ring members is, for the idler rolls, greater than the axial depth of the ring members, and is, for the turning bars, less than the axial depth of their respective ring members, said dimensions selected to prevent interference, during movement of the rings, between the idler rolls and the turning bars.

9. An oscillating hauloff device as defined in claim 8, further comprising ball bearings disposed between upper and lower surfaces of adjacent ring members, enabling the oscillating hauloff device to have a low profile construction.

10. An oscillating hauloff device as defined in claim 1, further comprising ball bearings disposed between upper and lower surfaces of adjacent ring members, enabling the oscillating hauloff device to have a low profile construction.

11. An oscillating hauloff device as defined in claim 10, wherein said ball bearings are formed by upwardly facing and downwardly facing surfaces of adjacent ring members that have machined grooves defining ball bearing races and ball elements confined in said races.

12. An oscillating hauloff device as defined in claim 11, wherein said ring members comprise welded metal members that form a hollow channel weldment, said weldment being in a stress relieved state, said ball bearing race being formed in the surface of the stress relieved weldment.

13. An oscillating hauloff device as defined in claim 1 or 11 further comprising computer numerical control machined alignment holes in the ring members, the position of which provides a precise angular relationship between the idler rolls and turning bars of the respective ring members.

14. An oscillating hauloff device as defined in claim 1, further comprising nip rolls connected to an uppermost ring for receiving blown film from an extruder disposed above said hauloff device.

15. An oscillating hauloff device as defined in claim 1, further comprising nip rolls connected to a lowermost ring for receiving blown film from an extruder disposed below said hauloff device.

16. An oscillating hauloff device as defined in claim 1, wherein at least one turning bar includes a plurality of flow-restricted outlets each including a longitudinally extending distribution channel disposed in the outside surface of the turning bar and constructed and arranged to distribute air along the surface of the turning bar substantially transverse to the direction of travel of the blown film line.

17. An oscillating hauloff device as defined in claim 16, further comprising a means for providing air to said turning bar from a source outside of a manufacturing facility.

18. An oscillating hauloff device as defined in claim 1, wherein at least one turning bar includes a backing bar disposed adjacent to the outside surface of said turning bar and constructed and arranged to reinforce said turning bar against deflection under tension applied by the film to the turning bar.

19. In an oscillatory hauloff mechanism for a blown film line wherein an assembly of idler rolls and turning bars rotatably shift their relationship to one another over time in a predetermined manner to enable the film to have gauge variations distributed back and forth across the width of the film, the improvement wherein there reside in the film path between first and second turning bars, first and second idler rolls spaced from each other on opposite sides of the axis of rotation of the mechanism such that the film path extends between said idler rolls across said axis and passes from said first turning bar around said first idler roll and then around said second idler roll in such a manner that the film in said path approaches said second turning bar from the opposite direction from which the film approaches said first turning bar, whereby the wandering effect of the film produced by passing over the fixed surface of said first turning bar is substantially canceled by the opposite wandering effect produced by passing over the fixed surface of said second turning bar.

20. The oscillatory hauloff mechanism as defined in claim 19, wherein said first and second turning bars are spaced from each other on opposite sides of the axis of rotation of the mechanism and said turning bars are located closer to the axis than said idler rolls.

* * * * *